(12) United States Patent
Cruz Dominguez et al.

(10) Patent No.: US 8,777,159 B2
(45) Date of Patent: Jul. 15, 2014

(54) INTERNAL STRUCTURE OF AIRCRAFT MADE OF COMPOSITE MATERIAL

(75) Inventors: Francisco Jose Cruz Dominguez, Madrid (ES); Elena Arevalo Rodriguez, Madrid (ES)

(73) Assignee: Airbus Operations S.L., Madrid (ES)

( * ) Notice: Subject to any disclaimer, the term of this patent is extended or adjusted under 35 U.S.C. 154(b) by 234 days.

(21) Appl. No.: 13/114,469

(22) Filed: May 24, 2011

(65) Prior Publication Data
US 2012/0001024 A1   Jan. 5, 2012

(30) Foreign Application Priority Data

Jun. 30, 2010 (ES) .................................. 201031014

(51) Int. Cl.
*B64C 1/14* (2006.01)
(52) U.S. Cl.
USPC .......................................................... 244/119
(58) Field of Classification Search
CPC ................................ B64C 1/14; B64C 1/1407
USPC ........................................................ 244/119
See application file for complete search history.

(56) References Cited

U.S. PATENT DOCUMENTS

| | | | | |
|---|---|---|---|---|
| 5,242,523 A | * | 9/1993 | Willden et al. | 156/285 |
| 5,520,358 A | * | 5/1996 | Kahn et al. | 244/129.5 |
| 7,530,531 B2 | * | 5/2009 | Wood et al. | 244/129.3 |
| 2003/0057737 A1 | * | 3/2003 | Bock et al. | 296/188 |
| 2006/0071125 A1 | * | 4/2006 | Wood et al. | 244/119 |
| 2007/0176048 A1 | * | 8/2007 | Huber et al. | 244/119 |
| 2009/0146008 A1 | * | 6/2009 | Thiele | 244/119 |
| 2011/0024562 A1 | * | 2/2011 | Kastner et al. | 244/119 |

OTHER PUBLICATIONS

U.S. Appl. No. 13/028,602, filed Feb. 16, 2011, Cruz Dominguez, et al.

* cited by examiner

*Primary Examiner* — Tien Dinh
*Assistant Examiner* — Justin Benedik
(74) *Attorney, Agent, or Firm* — Oblon, Spivak, McClelland, Maier & Neustadt, L.L.P.

(57) ABSTRACT

A reinforcement structure for an opening in the primary structure of an aircraft, the structure comprising a skin, frame members which are transverse with respect to the flying direction of the aircraft, and stringers which are longitudinal with respect to the flying direction of the aircraft. The reinforcing structure includes a perimetral reinforcing element situated along the edge of the opening and reproducing the geometrical form thereof; at least one pair of transverse reinforcing elements arranged on both transverse sides of the opening; and at least one pair of longitudinal reinforcing elements arranged on both longitudinal sides of the opening.

11 Claims, 10 Drawing Sheets

Section C-C

Section A-A

INTERNAL STRUCTURE OF AIRCRAFT MADE OF COMPOSITE MATERIAL

FIELD OF THE INVENTION

The present invention relates to an internal structure of an aircraft which is made of composite material, in particular for fuselages of aeronautical structures or for similar aircraft structures.

PRIOR ART

Aeronautical structures are designed with the aim of optimizing their minimum weight, while satisfying strength and rigidity criteria. As a result of this need it is becoming increasingly widespread to use composite materials in the internal structures of aircraft, in particular in the primary structures which form the fuselage thereof, since, by conveniently applying the said composite materials, it is possible to achieve, among other things, a major reduction in weight compared to a conventional design of the same structure manufactured in metal.

The primary structure which forms the fuselage of an aircraft, made of composite material, comprises a skin, stringers and frame members. The skin is stiffened longitudinally using stringers, made of composite material in an attempt to achieve a weight optimization of said skin. In turn, the frame members of composite material, which are arranged transversely with respect to the above stringers, prevent general instability of the fuselage and at the same time help achieve optimization of the skin and have the function of transmitting local incoming loads to the entire primary structure of the aircraft.

The skin of the primary structure of the fuselage of an aircraft, made of composite material, may be manufactured as a single 360-degree piece (so-called "one-shot skin"), this skin being conical or cylindrical, or may be manufactured separately in the form of several panels which are then joined together mechanically during a subsequent stage (so-called "panelled skin"). In both cases, i.e. one-shot skins and panelled skins, the longitudinal stringers made of composite material may be both co-bonded and co-cured with the composite covering skin. Moreover, the frame members made of composite material may also be co-bonded or co-cured with the said covering skin so as to obtain a final assembly with an integrated, composite-material, primary structure formed by skin, stringers and frame members, without the presence of riveted joints.

The term "integrated structure" is used to refer to a structure where the different component parts are made simultaneously in a single process and there is no need to use any type of joints or rivets. Thus, obtaining structures of the integrated type is another of the advantages of composite-material structures since, obviously, it is not possible to manufacture the said metal structures in a single integrated process. The composite-material integrated structures achieve a reduction in weight and, consequently, a reduction in costs, compared to similar non-integrated metal structures where it is required to assemble a large number of individual parts.

In structures which form the fuselage of an aircraft, it is required to provide—in many cases large-size-openings in the skin thereof with the aim of allowing access to the inside of the aircraft structure or else allowing other structural components of the aircraft to pass through.

These openings weaken the strength of the structure of the aircraft fuselage so that it is required to reinforce said openings by means of additional structural elements. In metal type structures, these openings must be reinforced by means of different parts and auxiliary metal elements which are riveted to the structure in question. The manufacture of each one of these components separately as well as their assembly by means of riveted joints and auxiliary parts involves in some cases an increase in weight and, in particular, increase in costs, when all the assembly operations are added together. In the sector of composite-material structures, it is common practice for the said openings to be reinforced by means of a frame-like structure formed by beams and frame members, made of metal or composite material, these elements in turn being joined together by means of different joining parts, which join these elements to the rest of the structure by means of rivets. Moreover, it is necessary in this type of structure to increase the thickness of the skin in the zones close to the opening provided so that said area is reinforced even more. The problem posed by reinforcements of this type is that it increases the number of additional parts of the base structure and also increases the weight until the necessary skin thickness is achieved in the region of the hole, all of this obviously resulting in higher costs. Moreover, as commented previously, the manufacture and assembly of these structures is laborious and of a highly manual nature in most cases since mass-production of these structures is not possible.

It would therefore be desirable, in the zones of openings in composite-material structures which form the fuselage of an aircraft, to have structures for reinforcing said openings where the frames formed by beams and frame members as well as all parts used for performing joining of the above are eliminated. It would also be desirable to integrate in the manufacturing process the reinforcement of said openings with the consequent reduction in the number of assembly operations.

The present invention aims to solve these problems.

SUMMARY OF THE INVENTION

Thus, one object of the present invention is to provide a reinforcing structure for openings formed in composite-material primary structures of aircraft such that the said primary structures comprise a skin, frame members which are transverse with respect to the flying direction of the aircraft and stringers which are longitudinal with respect to the flying direction of the aircraft. Preferably these openings are formed within the skin of the said primary structures. The structures for reinforcing these openings, according to the invention, comprise:

- a perimetral reinforcing element along the edge of the opening;
- at least one pair of transverse reinforcing elements arranged on both transverse sides of the opening in question;
- at least one pair of longitudinal reinforcing elements arranged on both longitudinal sides of the opening in question.

According to the invention, the perimetral reinforcing element along the edge of the opening of the primary structure of the aircraft is formed integrally and as one piece, in the associated process for manufacturing the skin, where it is obtained by means of co-bonding or co-curing. The transverse reinforcing elements of the reinforcing structure according to the invention reproduce the geometrical form of those elements of the primary structure on which they are to be arranged, so that they are located on the above by means of a co-bonding or co-curing process. Moreover, according to the invention, the longitudinal reinforcing elements are designed so that they have a greater thickness in the zones which border the said opening, such that said designs are obtained directly from the associated process for manufacturing the primary structure, therefore being co-bonded or co-cured in said structure. In this way a final aircraft structure is obtained where the additional elements and parts have been eliminated, with the formation of an integrated structure in which the structural efficiency has been increased and the cost efficiency optimized.

Other characteristic features and advantages of the present invention will emerge from the following detailed description of a non-limiting example of embodiment of its subject with reference to the accompanying figures.

BRIEF DESCRIPTION OF THE DRAWINGS

FIGS. 2 and 3 illustrate the concept of the reinforcing structure integrated in the skin without other additional parts. Said figures illustrate the concept of the reinforcement integrated in the edge of the hole and its dependency on the surrounding structure.

DETAILED DESCRIPTION OF THE INVENTION

Figure 1A:
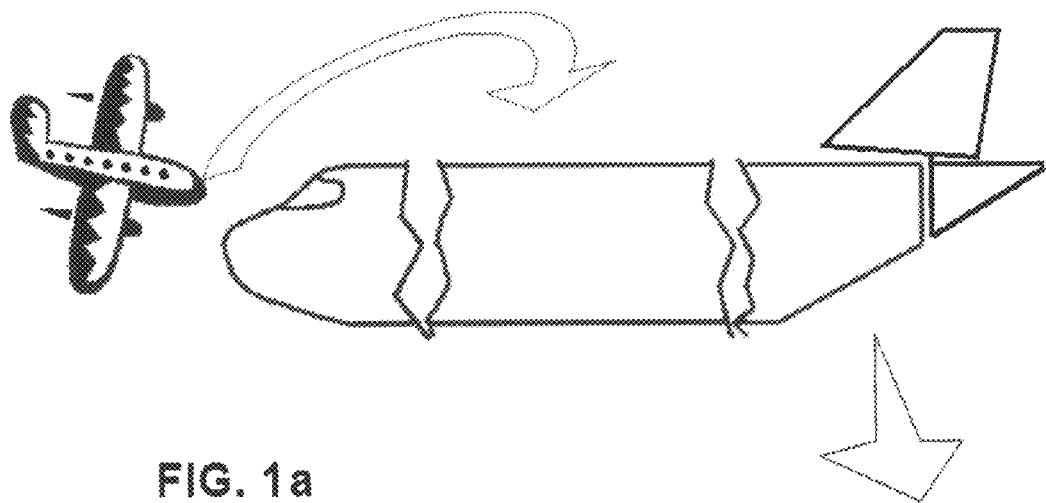
FIGS. 1a and 1b show the main components of the internal primary structure of the fuselage of an aircraft, as well as the reinforcing area of an opening formed in said fuselage, according to the known prior art.

Thus, according to a preferred embodiment of the invention, a reinforcing structure 1 for an opening 10 formed within the primary structure of an aircraft is provided, said primary structure being preferably made of composite material. These primary structures comprise a skin 2, frame members 3 which are transverse with respect to the flying direction of the aircraft, and stringers 4 which are longitudinal with respect to the flying direction of the aircraft. The openings 10 are formed within the skin 2 of the said primary structures.

Figure 1B:
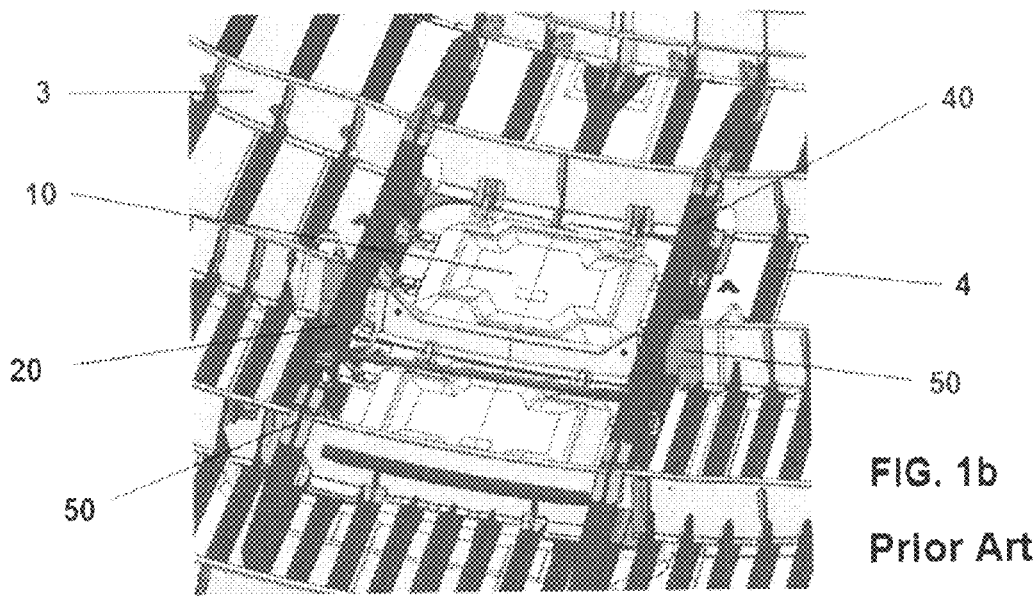
Figure 2:
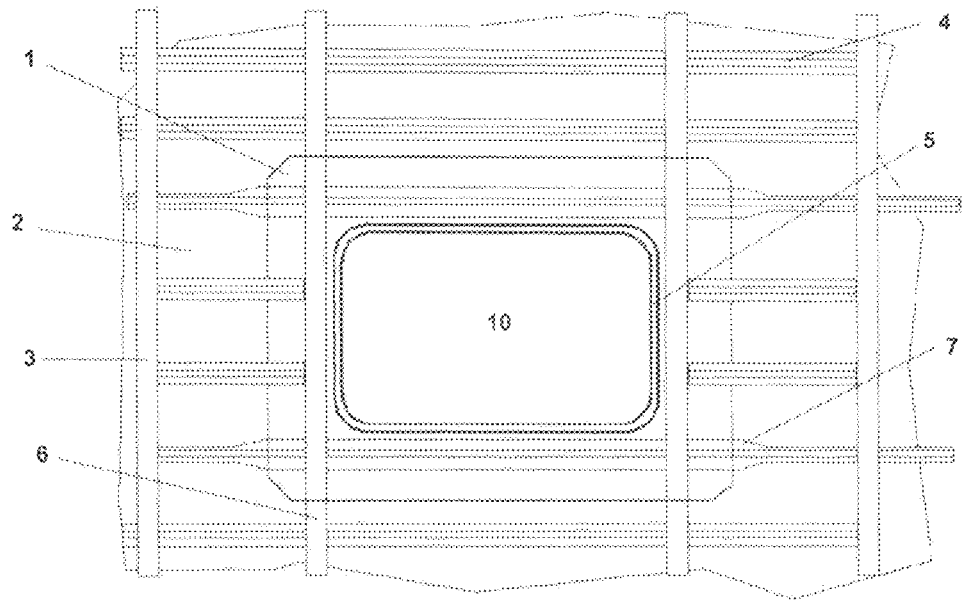
FIG. 2 shows in schematic form the reinforcing structure for an opening formed in the primary structure of an aircraft, made of composite material, according to the present invention.

In accordance with that shown in FIGS. 1a and 1b, an opening 10 formed within the fuselage of an aircraft, when this opening 10 is large in size, comprises, according to the known prior art, a reinforcing structure 20 which consists in forming a frame around the abovementioned opening 10, with additional parts in the form of beams 40. The beams 40 are riveted to the skin 2 and are joined or riveted to the frame members 3 of the primary structure by means of additional parts 50 in the form of angle pieces and flat strips. These beams 40 may be also joined to the stringers 4 which form part of the said internal structure of the skin 2. Moreover, it is customary practice in the known prior art to increase the thickness of the skin 2 significantly in the zone close to the opening 10, owing to the need for maximum deformation along the edge of said opening 10, with the corresponding increase in weight which this involves.

According to the present invention, as can be seen in FIG. 2 and FIGS. 3a, 3b, 3c and 3d, the reinforcing structure 1 for an opening 10 within the skin 2 of the primary structure of an aircraft, according to the invention, comprises:

a perimetral reinforcing element 5 along the edge of the opening 10;

at least one pair of transverse reinforcing elements 6 arranged on both transverse sides of the opening 10 in question;

at least one pair of longitudinal reinforcing elements 7 arranged on both longitudinal sides of the opening 10 in question.

Figure 3A:
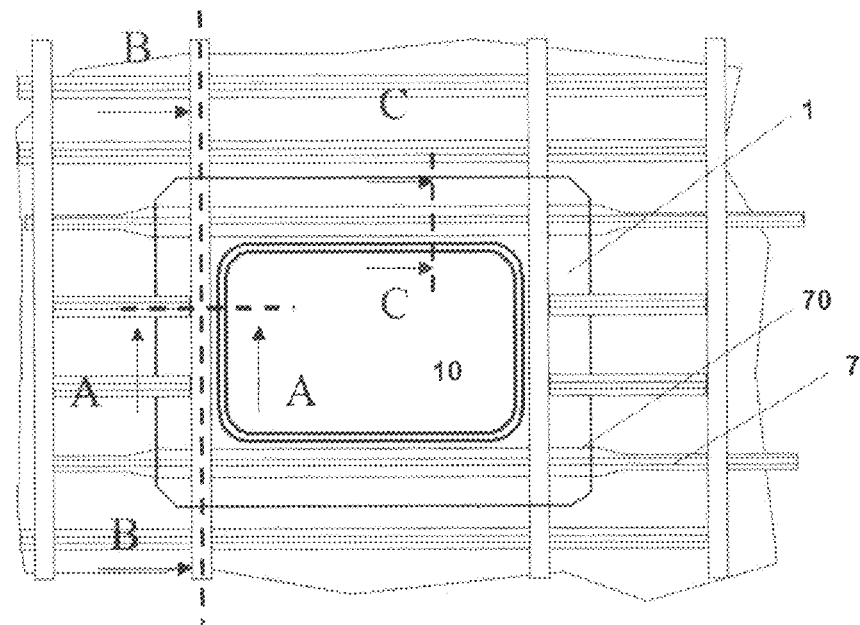
FIGS. 3a, 3b, 3c and 3d show a reinforcing structure for an opening formed in the primary structure of an aircraft, made of composite material, according to the present invention, as well as various cross-sectional details thereof.
Figure 3B:
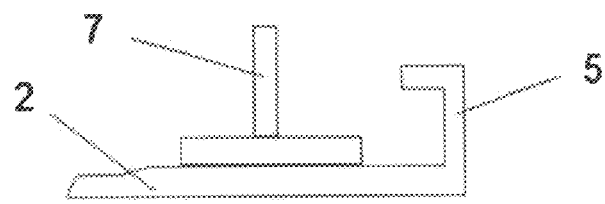
Figure 3C:
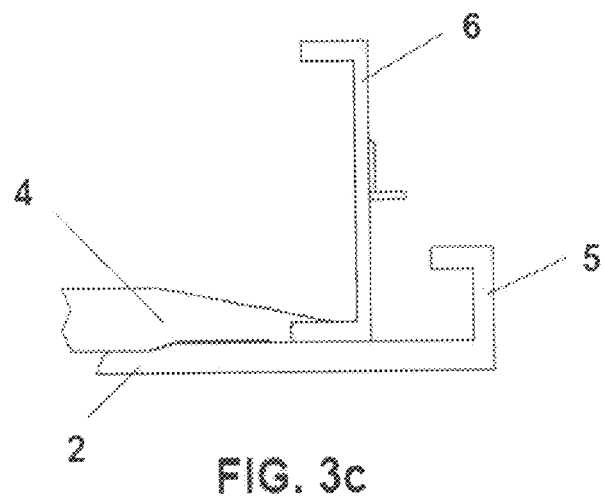
Figure 3D:
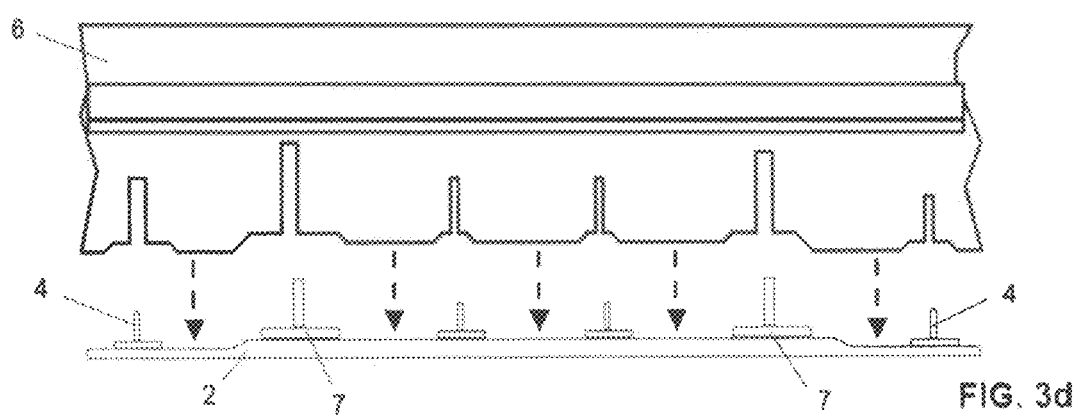
Figure 4A:
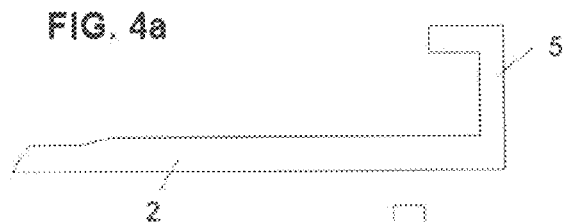
FIGS. 4a to 4j show various possible embodiments of the perimetral reinforcing element along the edge of the opening formed in the primary structure of an aircraft, made of composite material, according to the present invention.
Figure 4B:
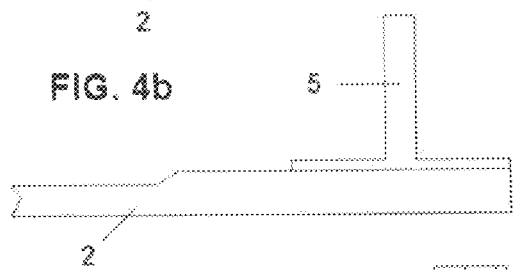
Figure 4C:
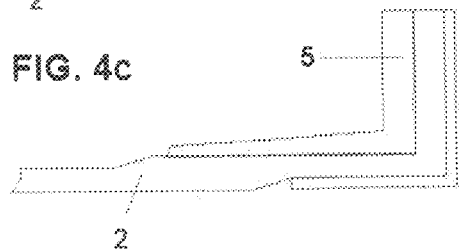
Figure 4D:
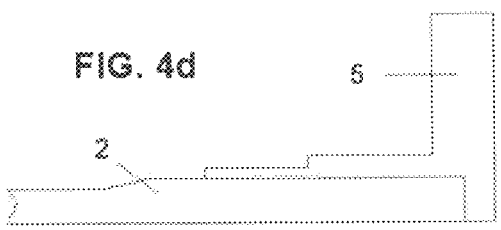
Figure 4E:
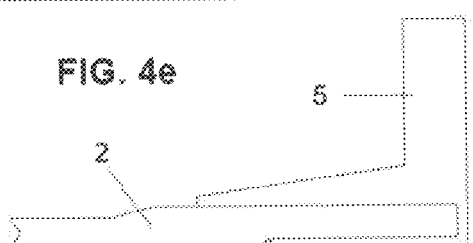
Figure 4F:
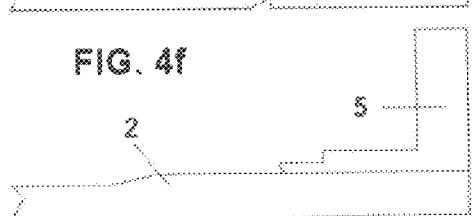
Figure 4G:
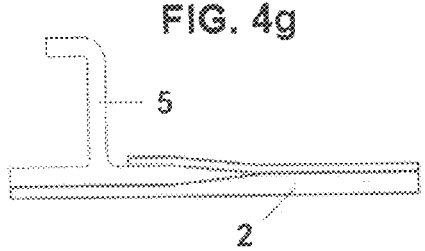
Figure 4H:
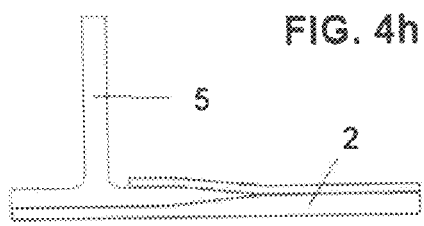
Figure 4I:
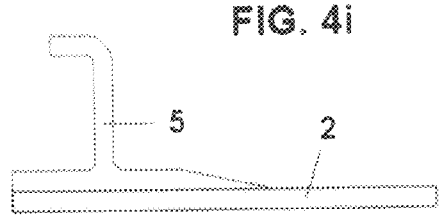
Figure 4J:
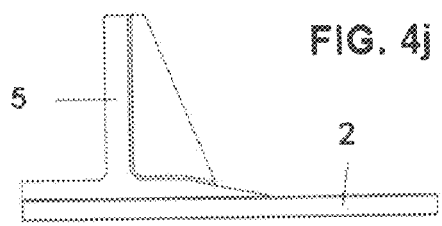

According to the invention, the perimetral reinforcing element 5 along the edge of the opening 10 of the primary structure of the aircraft is obtained, integrated and as one piece, during the associated process for manufacture of the skin 2, by means of co-bonding or co-curing. The transverse reinforcing elements 6 of the reinforcing structure 1 according to the invention (FIG. 3d) reproduce the geometrical form of those parts of the primary structure on which they are arranged so that they are arranged on top of said parts by means of a co-bonding or co-curing process. Thus, as can be seen in FIG. 3d, the transverse reinforcing element 6 shown reproduces, in cross-section, the geometrical form of the skin 2, the stringers 4 and the longitudinal reinforcing elements 7, on which the said element 6 is to be arranged. Moreover, according to the invention, the longitudinal reinforcing elements 7 are designed so that they are stringers which are longitudinal with respect to the flying direction of the aircraft and have a greater thickness 70 in the zones which border the said opening 10, such that said zones of greater thickness 70 are obtained directly from the associated process for manufacture of the primary structure, by means of co-bonding or co-curing in said structure. In this way, the internal structure of the aircraft according to the invention is an integrated structure, where the beams 40 and the additional parts 50 which were used in the prior art have been eliminated. The underlying notion of the invention is to optimize the design of a carbon-fibre skin by providing a more integrated solution and increasing the structural efficiency and also reducing costs. The fact of not using additional parts or elements, as in the prior art, also has the advantage of avoiding, during the manufacturing process, the tolerances of said elements or parts which, obviously, complicate and increase the cost of the process for manufacture thereof, as well as subsequent assembly thereof. Moreover, according to the prior art, the structures achieved have a lot of accumulated tension, while, according to the invention, such accumulated tension and loads are avoided.

Thus, for large openings 10, the present invention proposes a novel reinforcing concept based on weight optimization and a reduction in manufacturing and assembly costs. For this purpose, the reinforcing structure 1 which is shown in FIGS. 2 and 3a-3d is defined, with the idea of integrating a series of solutions in such a way that the combination of all of them allows optimization of the structure in terms of weight and cost. For this purpose, a perimetral reinforcing element 5 along the edge of the opening 10 is defined, said reinforcing element being in the form of a profile integrated in the associated skin 2 and following or reproducing the geometrical form of the opening 10. The rest of the structure is not modified with additional parts, it not being necessary to join frame members 3 to additional elements over and above the already existing joints with the skin 2. By optimizing the weight it may be necessary, in the vicinity of the opening 10, to increase the rigidity of both the transverse reinforcing elements 6, the longitudinal reinforcing elements 7 and the skin 2 by means of a larger cross-section. Thus the longitudinal reinforcing elements 7 with a larger thickness 70 in the zones which border the abovementioned opening 10, in accordance with the above description, constitute a further embodiment of the present invention.

The manufacturing process of taping the skin 2 within the internal structure of the aircraft fuselage is not modified by the solution proposed by the invention.

The perimetral reinforcing element 5 along the edge of the opening 10 according to the invention provides the opening 10 with a sufficient structural strength and necessary buckling resistance. As commented above, the perimetral reinforcement 5 still exists in the reinforcing structure 1 according to the invention, while, by way of a second form of reinforcement of the opening 10, the invention involves, where necessary, providing the stringers 4 and the frame members 3, and in some cases the skin 2 as well, with a greater thickness around the above opening 10. In none of these cases is the process for manufacturing the skin modified, it being possible to mass-produce the reinforcing structures 1, unlike in the known prior art.

According to the above description, the novel reinforcing solution for large openings 10, according to the invention, consists in combining, according to structural requirements, the following set of solutions, avoiding the need for intersections with structural joints between beams 40 and frame members 3:

- defining a reinforcing structure 1 which comprises at least one pair of transverse reinforcing elements 6 arranged on both transverse sides of the opening 10, in the form of a profile which reproduces the geometrical form of the opening 10 along its entire perimeter; said profile may be integrated in the associated skin 2 or riveted thereto, this solution being valid for the different forms of openings 10 which are normally used;
- defining structural reinforcements adjacent to the said opening 10, in the form of frame members 3 and longitudinal reinforcing elements 7 formed by stringers of the internal structure which have a greater thickness 70, without the need for additional parts.

The internal structure of the aircraft is preferably made of composite material which may be both carbon fibre and glass fibre with thermostable or thermoplastic resin, although the internal structure may also be made of metal. The main field of application of the reinforcing structure 1 according to the invention consists in fuselages of aeronautical structures, although the invention may also be applied to other structures with similar characteristics, such as aircraft torsion boxes. Likewise the materials may be pre-impregnated or dry-fibre materials and, in this latter case, resin infusion processes may be used for manufacture thereof.

The reinforcing structure 1 according to the invention is applicable to any type or form of stringer 4 and any type or form of frame member 3 which form the internal structure of the aircraft. Moreover, the invention is applicable to any type of fuselage skin 2.

Figure 8A:
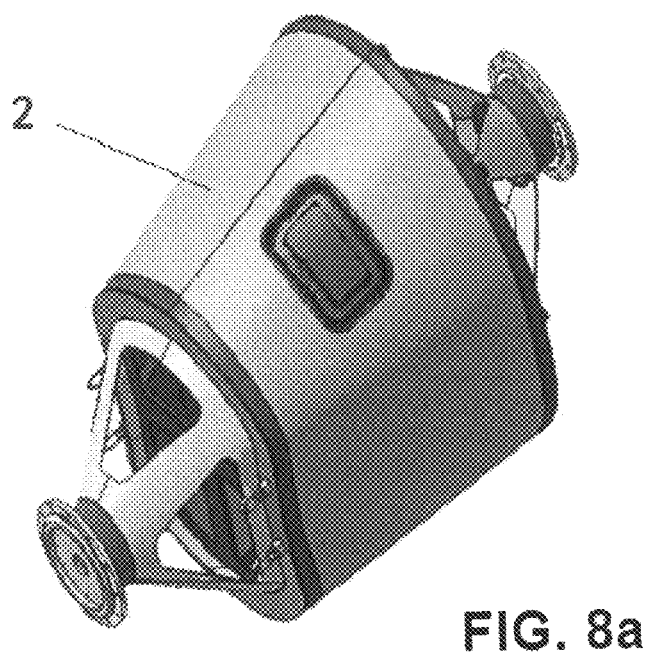
FIGS. 8a, 8b and 8c illustrate application of the reinforcing structure in an opening formed in the primary structure of an aircraft, made of composite material, said primary structure comprising a "one-shot" 360-degree skin or a skin made with panels, according to the present invention.
Figure 8B:
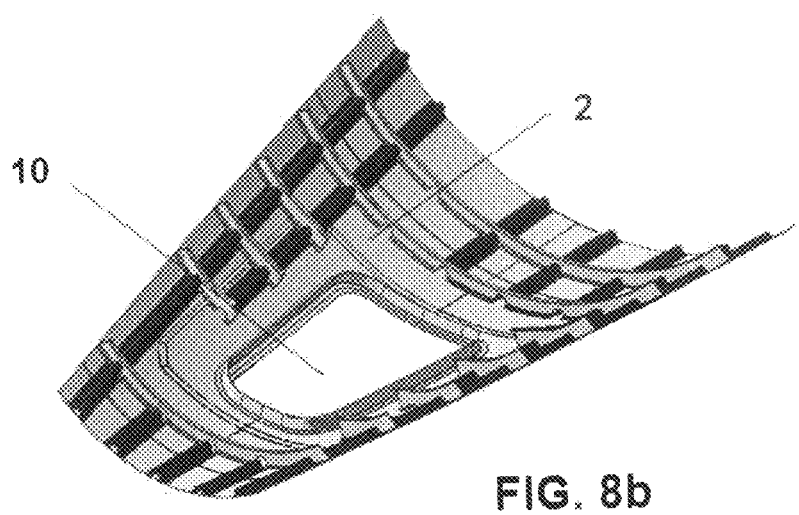
Figure 8C:
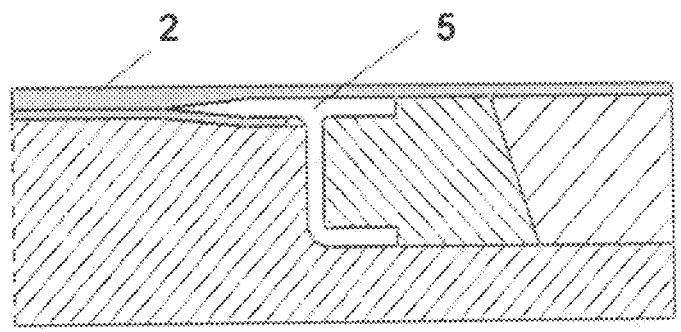

The perimetral reinforcing element 5 along the edge of the opening 10 may be made in different ways, as can be seen from FIGS. 4a to 4j. In any of the above options, it is required to provide the opening 10 with a reinforcement along the perimeter thereof and perpendicular to the surface which defines the said opening 10, with the result that, usually, the perimetral reinforcement 5 will be perpendicular to the surface defined by the skin 2. The said perimetral reinforcement 5 may be obtained by means of integration in the associated process for manufacture of the skin 2, both in the case where the said skin 2 is manufactured in a "one-shot" operation (360 degrees using collapsible tools) and in the case where manufacture of the skin 2 is performed using various panels of said skin 2 separately, these being joined together subsequently in order to form the final 360-degree skin. FIG. 8a shows in schematic form the configuration of the tool which is used for taping so that the perimetral reinforcement 5 is positioned at the appropriate moment on this tool, taping being continued after positioning said reinforcement 5, with subsequent curing of the entire assembly. FIG. 8b shows in schematic form the design of the reinforcing structure 1 on a skin 2 which is formed by different panels. FIG. 8c shows in cross-section how the perimetral reinforcement 5 according to FIG. 4g would be integrated in the skin 2 of the reinforcing structure 1, according to a preferred embodiment of the invention: the perimetral reinforcement 5 is embedded in the skin 2 so that, during subsequent curing of the structure, an integrated one-piece structure is obtained.

Figure 5A:
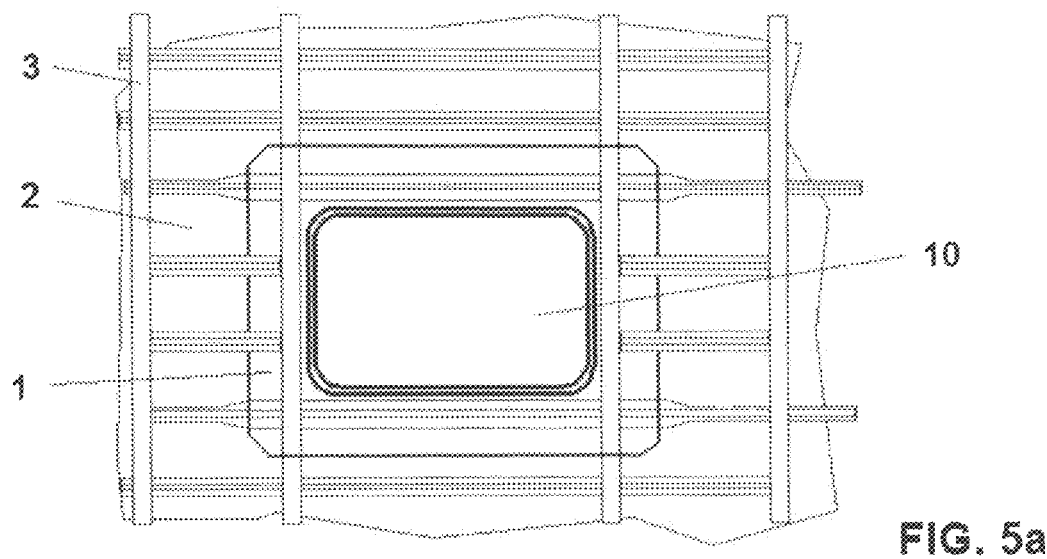
FIGS. 5a and 5b show different embodiments of the opening formed in the primary structure of an aircraft, made of composite material, according to the present invention.
Figure 5B:
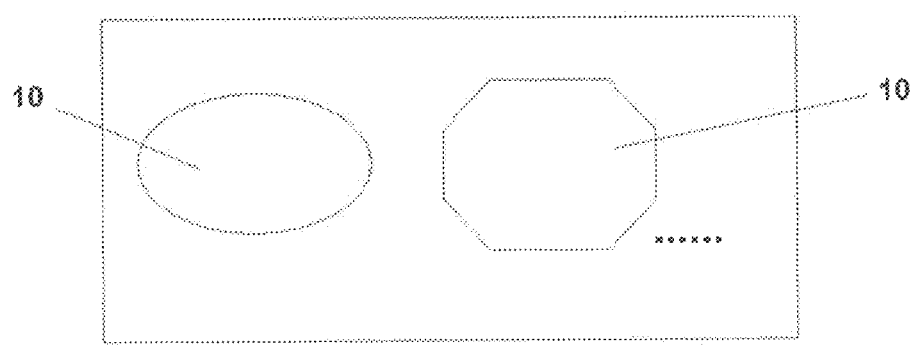

The invention is applicable to any form of opening 10, as shown in FIGS. 5a and 5b: circular, oval or rectangular openings with round edges, square openings with round edges, etc.

Figure 6:
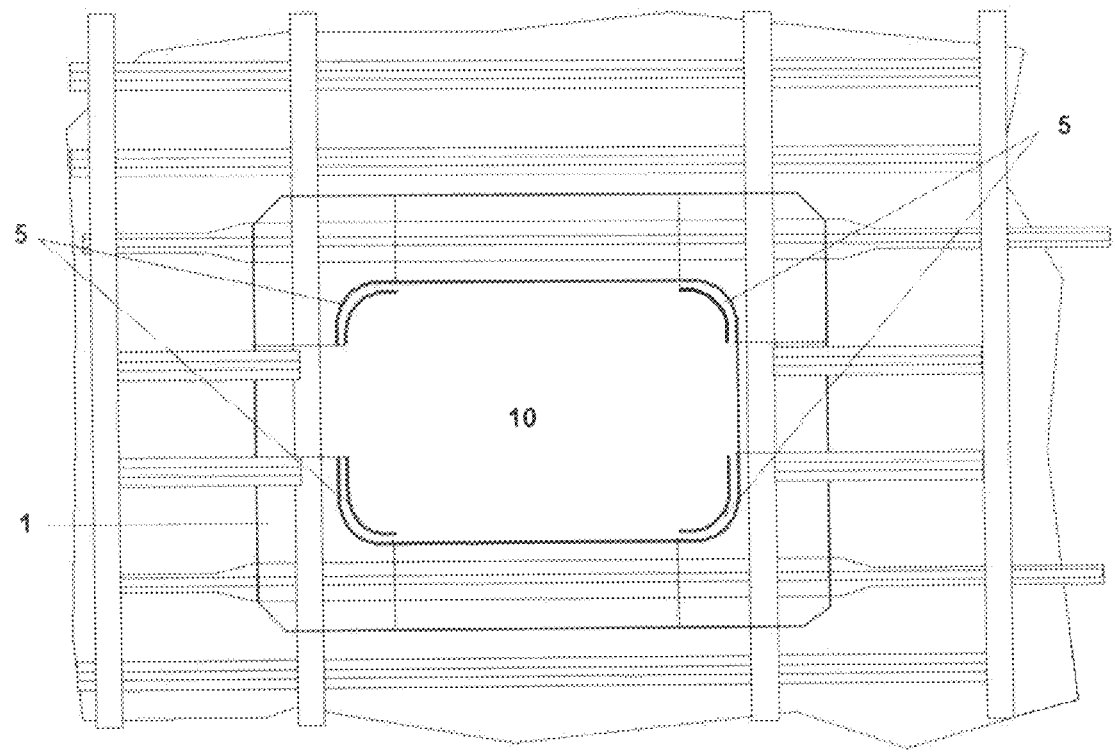
FIG. 6 shows another embodiment of the reinforcing structure for an opening formed in the primary structure of an aircraft, made of composite material, according to the present invention.
Figure 7A:
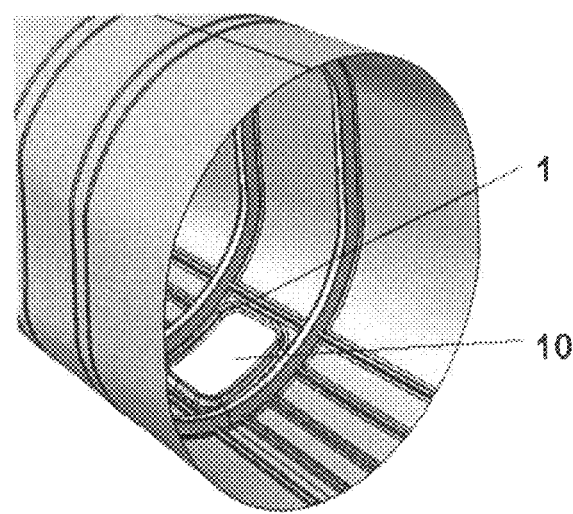
FIGS. 7a, 7b and 7c show the reinforcing structure for an opening formed in the primary structure of an aircraft, made of composite material, according to the present invention.
Figure 7B:
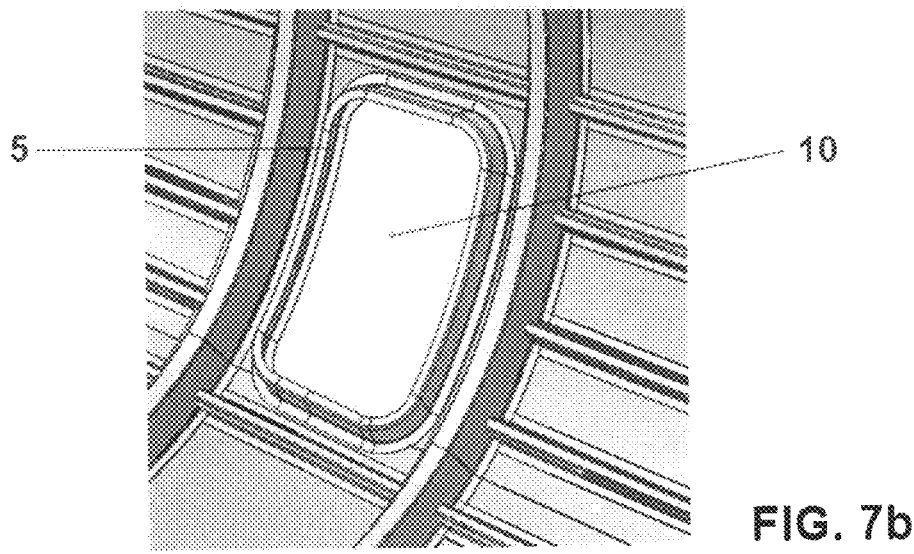
Figure 7C:
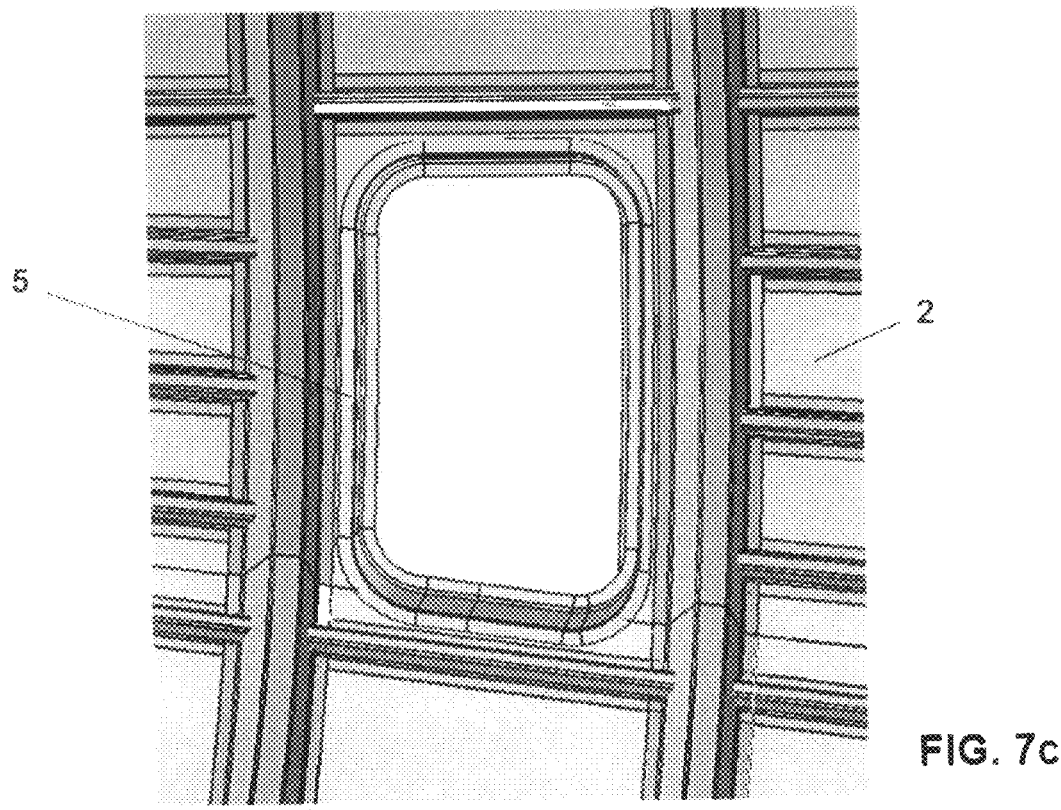

As shown in FIG. 6, in given situations with regard to load and geometrical form requirements, the reinforcing structure 1 of the invention may only be necessary in certain zones of the opening 10, so that the perimetral reinforcing element 5 is formed only in certain zones of the edge of the opening 10.

The present invention provides a solution for reinforcement of large openings which is able to withstand damage more easily with the provision of a double reinforcing belt which is formed, in the first instance, by the perimetral reinforcement 5 and, in the second instance, by the set of structural elements which surround said perimetral reinforcement 5 such as: the transverse reinforcing elements 6, in some cases with a larger cross-section compared to the cross-section of the transverse frame members 3, the longitudinal reinforcing elements 7 with a larger thickness 70 in the zones which border the opening 10, and the reinforcement of the skin 2, which in some embodiments also has a larger cross-section.

The invention may be applicable both to highly stressed zones of the skin 2 of the fuselage of an aircraft, as is the case of the rear end of the aircraft, as well as to other parts of the fuselage.

Although the present invention has been described entirely in connection with preferred embodiments, it is evident that it may be subject to those modifications within the scope thereof, this not being regarded as limited by the above embodiments, but by the content of the following claims.

The invention claimed is:

1. A reinforcement structure for an opening in a primary structure of an aircraft, the primary structure comprising a skin, frame members which are transverse with respect to a flying direction of the aircraft, and stringers which are longitudinal with respect to the flying direction of the aircraft, the reinforcement structure, comprising:

a perimetral reinforcing element situated along an edge of the opening and reproducing a geometrical form of the opening;

at least one pair of transverse reinforcing elements arranged on both transverse sides of the opening; and at least one pair of longitudinal reinforcing elements arranged on both longitudinal sides of the opening, the longitudinal reinforcing elements being stringer elements having a greater thickness in zones which border the opening.

2. The reinforcement structure according to claim 1, wherein the perimetral reinforcing element is formed in an integrated manner and as one piece during an associated process for manufacture of the skin.

3. The reinforcement structure according to claim 1, wherein the transverse reinforcing elements reproduce a geometrical form of elements of the primary structure on which they are arranged, reproducing in cross-section a geometrical form corresponding to the forms of the skin, the stringers and the longitudinal reinforcing elements.

4. The reinforcement structure according to claim 1, wherein the transverse reinforcing elements and the skin have a larger cross-section in zones around the opening.

5. The reinforcement structure according claim 1, wherein the perimetral reinforcing element is arranged along an entirety of the edge of the opening.

6. The reinforcement structure according to claim 1, wherein the perimetral reinforcing element is arranged in zones along the edge of the opening.

7. The reinforcement structure according to claim 1, wherein the primary structure of the aircraft is made of composite material.

8. The reinforcement structure according to claim 7, wherein the primary structure is made of carbon fibre or glass fibre with thermostable or thermoplastic resin.

9. An aircraft which comprises the reinforcement structure according to any one of claims 1 to 3 and 4 to 8.

10. The reinforcement structure according to claim 1, wherein the perimetral reinforcing element and the skin are made of composite materials and are integrated as one piece of composite material.

11. The reinforcement structure according to claim 10, wherein the longitudinal reinforcing elements are made of composite materials and are integrated into the one piece of composite material.

* * * * *